United States Patent [19]
Martin et al.

[11] 3,810,040
[45] May 7, 1974

[54] MULTI-COLOR FACE-PUMPED LIQUID LASER DEVICE

[75] Inventors: William S. Martin, Schenectady; Donald R. White, Rexford, both of N.Y.

[73] Assignee: General Electric Company, Schenectady, N.Y.

[22] Filed: June 14, 1971

[21] Appl. No.: 152,582

[52] U.S. Cl.................. 331/94.5, 330/4.3, 356/246
[51] Int. Cl. ........ H01s 3/05, H01s 3/09, H01s 3/02
[58] Field of Search..................... 331/94.5; 330/4.3; 356/246

[56] References Cited
UNITED STATES PATENTS

| | | | |
|---|---|---|---|
| 3,500,231 | 3/1970 | Tomiyasu et al. | 331/94.5 |
| 3,538,453 | 11/1970 | Miller | 331/94.5 |
| 3,633,126 | 1/1972 | Martin et al. | 331/94.5 |
| 3,626,318 | 12/1971 | Young | 331/94.5 |
| 3,581,229 | 5/1971 | Martin | 331/94.5 |

OTHER PUBLICATIONS

Watson et al., IEEE J. of Quantom Electronics, Vol. QE-4, No. 11, November 1968, pp. 842-849 QC 447 I2.

Primary Examiner—David Schonberg
Assistant Examiner—R. J. Webster
Attorney, Agent, or Firm—Paul A. Frank

[57] ABSTRACT

A plurality of flowing (or nonflowing) sheets of active liquid laser media, generally having different color emissions, are each optically excited along at least one of its major surfaces to produce a plurality of coherent electromagnetic radiations each characteristic of the liquid medium employed. In one embodiment, single sheets of a plurality of the liquid laser media are produced in superposed orientation in a liquid-tight chamber, and a multi-color colinear beam of coherent electromagnetic radiation having the combined radiation characteristics of the plurality of liquid laser media, longitudinally transverses the superposed liquid laser media sheets in an off-axial direction to effect multiple total internal reflections of the beam and cause each ray thereof to pass through substantially identical thermal environments thereby substantially reducing distortion of the beam wavefront. In another embodiment, spaced refracting prisms are positioned in a liquid-tight chamber and a plurality of separate zig-zag patterns of the laser liquid sheets are formed in the spacings between adjacent prisms to produce a like plurality of spatially separate laser beams. The pumping radiation is incident on the refracting prisms and is refracted and reflected through the prisms to produce substantially uniform pumping along the major surfaces of the sheets of liquid laser media. The pumping means is laterally positioned with respect to the laser beam axes which coincide with the longitudinal axes of the zig-zag patterns. In this case also, each ray of a beam of coherent electromagnetic radiation experiences the same temperature distribution as it passes through a sheet of liquid laser medium, thereby substantially reducing distortion of the beam waveform.

7 Claims, 12 Drawing Figures

INVENTORS
WILLIAM S. MARTIN
DONALD R. WHITE
BY Louis A. Moucha

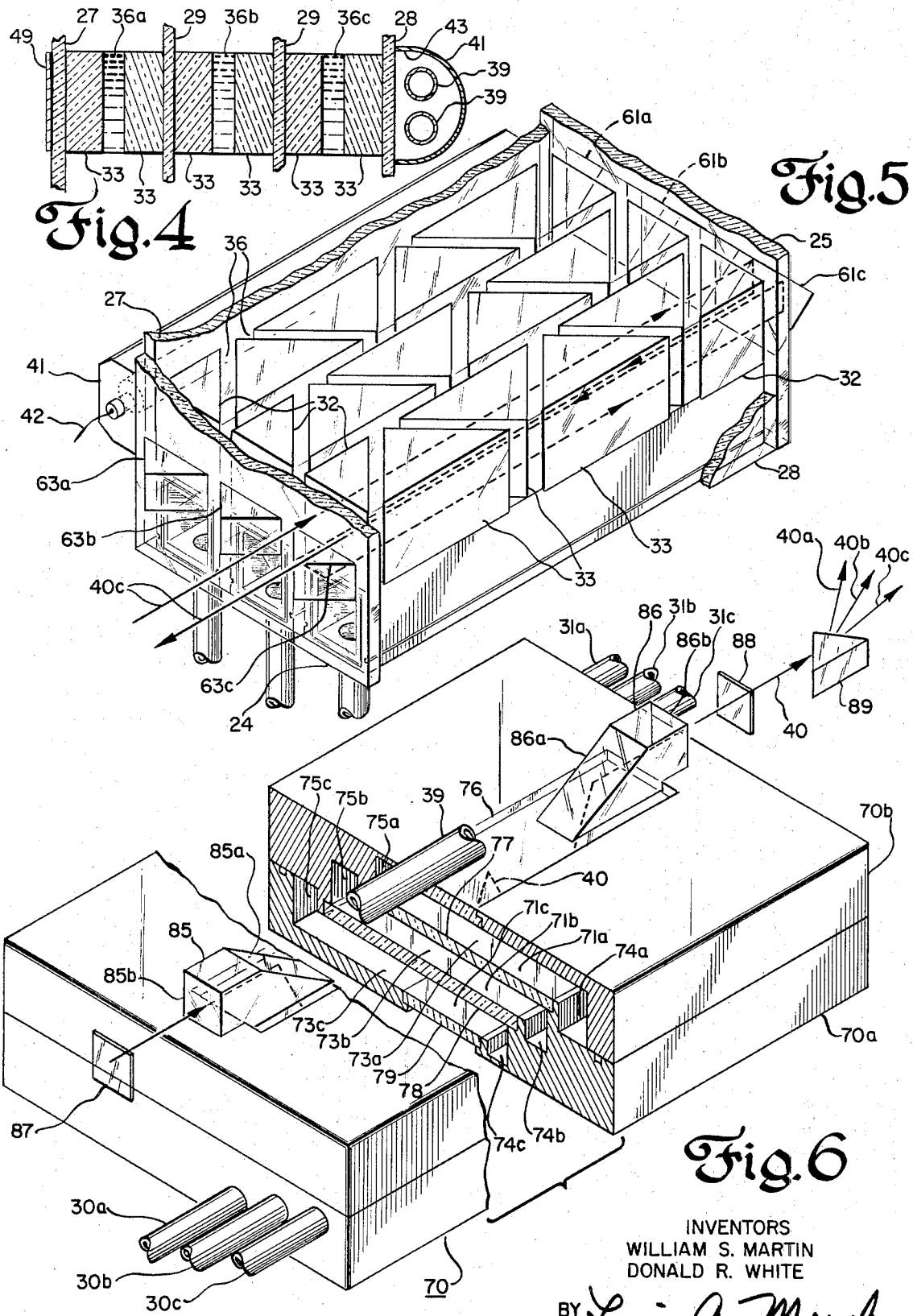

PATENTED MAY 7 1974 3,810,040

INVENTORS
WILLIAM S. MARTIN
DONALD R. WHITE

BY Louis A. Moucha

MULTI-COLOR FACE-PUMPED LIQUID LASER DEVICE

Our invention relates to a liquid laser device wherein optical distortion due to the relatively high variation in index of refraction with temperature exhibited by most laser liquids is substantially minimized, and in particular, to a multi-liquid laser device wherein the liquid laser media are formed into flowing or nonflowing sheets which are optically pumped through one or both major surfaces thereof.

Liquid laser devices are subject to optical distortion due to, among other factors, the relatively high variation of index of refraction with temperature exhibited by most liquids including active liquid laser media. The variation in the temperature of the liquid across the laser aperture results in beam distortion (especially beam divergence) and a concomitant reduction in efficiency or cessation of lasing action of the laser device. Such temperature variation generally results from (1) nonuniform optical pumping across the aperture produced by "side-pumping" of the liquid laser medium, (2) turbulence in the aperture caused by mixing a nonuniformly heated liquid, (3) heating produced by the flow of the liquid laser medium due to the effects of nonzero viscosity and nonuniform velocity profile, and (4) temperature differences between the fluid and the walls of its container.

Conventional liquid lasers are optically pumped in a pumping cavity configuration similar to that used with the rod-type solid state laser, that is, a cylindrical body of liquid laser medium is pumped from a direction perpendicular to the direction of the emitted laser beam, such pumping is herein described as side-pumping. As noted above, such side-pumping produces nonuniform optical excitation and inversion across the aperture of the particular active laser medium utilized in the laser device. Such problem is solved in a single liquid laser device by forming the active liquid laser medium into a single or plurality of flowing or nonflowing sheets of the liquid and optically exciting each sheet at least along one of the major surfaces as described and claimed in a concurrently filed patent application Ser. No. 152,701, filed June 14, 1971, in the name of William S. Martin and assigned to the assignee of the present invention.

Therefore, one of the principal objects of our invention is to provide a multi-liquid laser device wherein at least one major surface or face of each liquid laser medium is optically pumped to provide a multi-color output.

Another object of our invention is to form each of the liquid laser media in one or more sheets of the flowing (or nonflowing) liquid to thereby obtain the major surfaces which are optically pumped.

A further object of our invention is to provide a face-pumped liquid laser device having the liquid sheets arranged in a plurality of zig-zag patterns corresponding to the number of liquid laser media employed and with pumping means positioned laterally with respect to the laser beam axes.

A still further object of our invention is to provide a face-pumped liquid laser device wherein a colinear laser beam traverses a plurality of liquid sheets of different liquid laser media in an off-axial direction to thereby undergo multiple total internal reflections.

Briefly, in accordance with our invention, we provide a face-pumped liquid laser amplifier or oscillator device wherein a plurality of liquid laser media is each formed into one or more flowing (or non-flowing) sheets of the liquid and the major surfaces thereof are optically pumped. A liquid-tight chamber is provided with ducts for supplying the liquid laser media to the chamber and exiting the liquids therefrom. The chamber is also provided with suitable structure for forming the desired sheets of liquid laser media. Pumping radiation means are used such as flash lamps which may be supported external of the chamber and oriented for impinging the pumping radiation along one or both major surfaces of the adjacent liquid sheets. In a first embodiment, the structure inside the chamber includes a plurality of refracting prisms transparent to the pumping radiation and having spaced adjacent first surfaces forming interfaces with the sheets of a first liquid laser medium flowing therebetween. The spacings between adjacent refracting prisms are arranged in a "zig-zag" pattern and the pumping radiation is incident on the prisms and refracted and reflected therethrough to provide substantially uniform pumping along the major surfaces of the liquid sheets which produces a laser beam coincident with the longitudinal axis of the zig-zag pattern. A plurality of zig-zag patterns of the refracting prisms are positioned in juxtaposed relationship within the chamber corresponding to the number of liquid media employed to produce or amplify a like plurality of spatially separate laser beams. In a second embodiment, the structure inside the chamber forms the liquid laser media into a plurality of superposed, elongated single sheets of the flowing or nonflowing liquids corresponding to the number of liquid media employed and the pumping radiation is directed toward the major surfaces thereof. A multi-color (not limited to the visible wavelengths) colinear laser beam passes longitudinally through the superposed liquid laser media sheets in an off-axial direction and undergoes multiple total internal reflections in its passages therethrough. The multiple total internal reflections cause each ray of the laser beam to pass through substantially identical thermal environments during passage through the liquid laser media to thereby substantially reduce distortion of the beam wavefront. The colinear beam output can be spatially separated into a multi-color output, and the multi-color output of zig-zag embodiment can be combined into a colinear beam, by use of suitable prisms or other conventional optical means. In both embodiments, flowing of the liquid laser media may be utilized to provide a removal of the heat generated in the liquid from the laser structure and also to minimize the variation in indices of refraction of the liquids by minimizing variations of the temperature of the liquids or the containing structure with position or with time.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character, and wherein:

FIG. 4 is an end view in section of the prism and pumping portion of the device of FIG. 1 but with pumping limited to only one side;

FIG. 5 is a broken away isometric view of a zig-zag embodiment of our liquid laser device utilized with laser beam path folding apparatus;

FIG. 6 is a partially broken away isometric view of a multiple internal reflection embodiment of our multi-color liquid laser device;

Figure 1:
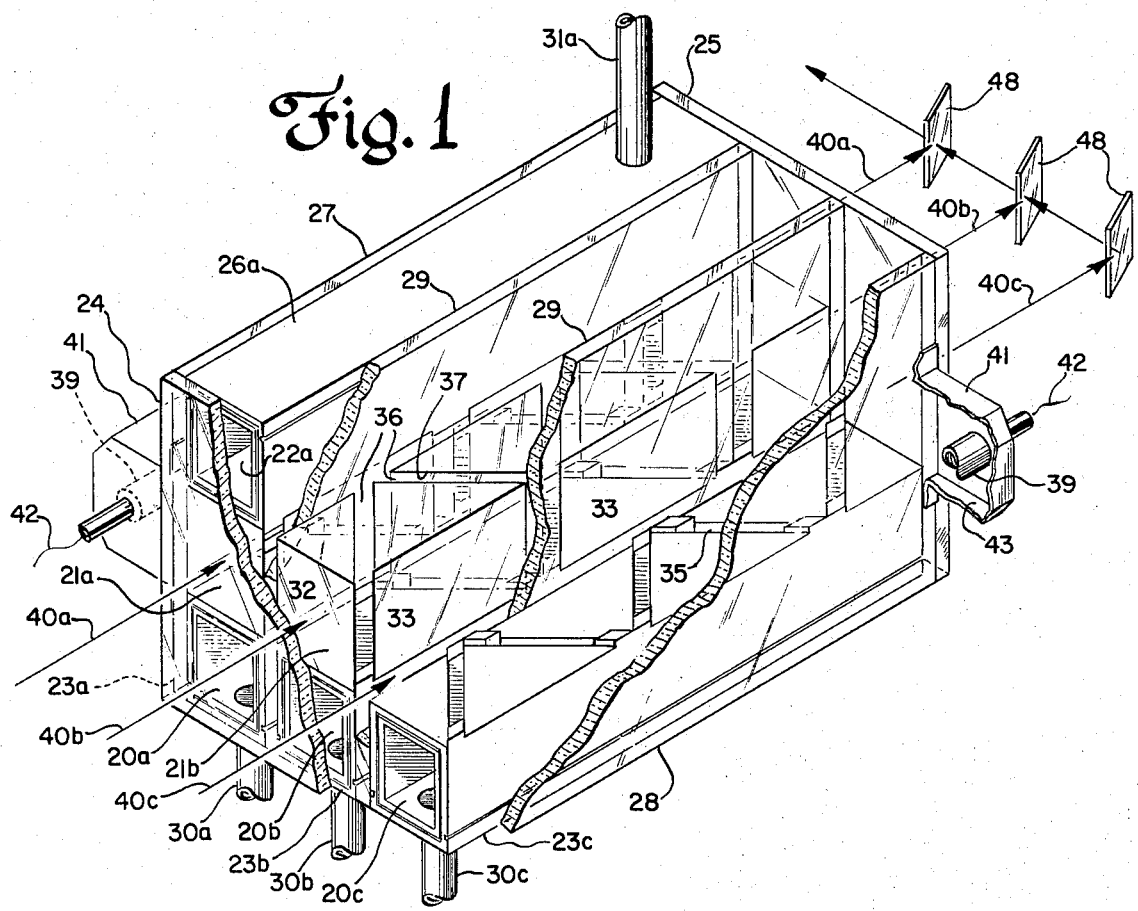
FIG. 1 is a partially broken away isometric view of a zig-zag embodiment of our multi-color liquid laser device.
Figure 2:
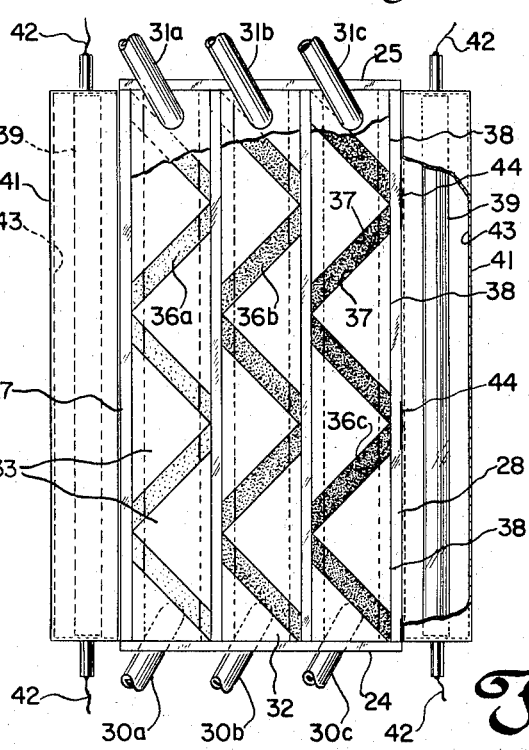
FIG. 2 is a partially broken away top view of the device illustrated in FIG. 1.
Figure 3:
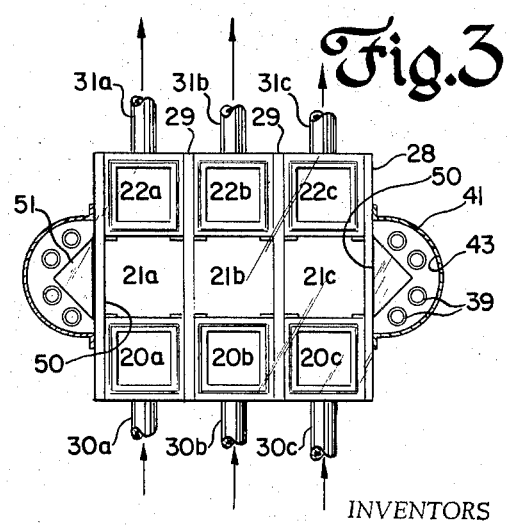
FIG. 3 is an end view of the device illustrated in FIG. 1 with the addition of immersion apparatus.

FIGS. 1–3 are views of a first embodiment of what will be described herein as a zig-zag version of our multi-color, face-pumped liquid laser device wherein the end view of FIG. 3 additionally includes immersion apparatus which will be described separately hereinafter. The use herein of the expression "multi-color" is not restricted to the visible wavelengths and thus includes infrared and other nonvisible laser wavelengths. The device, without the use of suitable means for combining the laser beam outputs, essentially consists of an "$n$" plurality of liquid laser devices housed in a liquid-tight chamber and adapted to produce an $n$ plurality of laser beam outputs wherein each beam may be of a different color (different emission band wavelengths or selection of different wavelengths within an emission band) as determined by the particular active liquid laser media employed. The chamber is composed of $3n$ parallel oriented, elongated, linear compartments $20a-n$, $21a-n$ and $22a-n$, the related compartments ($20a$, $21a$, $22a$)-----($20n$, $21n$, $22n$) being interconnected to form the $n$ separate liquid lasers. All of such compartments may be of square or rectangular cross-section as two examples, it being understood that such cross-sections may also be other figures. Compartments $20a-n$ are formed of juxtaposed channel members $23a-n$ each enclosed along three sides thereof, and planar end plate members 24, 25 for enclosing all of the compartments along the two ends thereof. Compartments $22a-n$ are formed of juxtaposed channel members $26a-n$ also each enclosed along three sides thereof, and central compartments $21a-n$ are defined along first opposite sides by the unenclosed sides of corresponding channel members $23a-n$ and $26a-n$ and along the two other opposite sides by planar side plate members 27, 28 and an $n-1$ plurality of intervening planar separator plate members 29 oriented parallel to side plate members 27 and 28. In the embodiments illustrated herein, our apparatus will be described as a three-color, face-pumped liquid laser and thus $n=3$ in the above-described $n$ plurality of compartments and $n-1$ separator plate members. Thus, our apparatus as illustrated in FIGS. 1–3 has the parallel arrangement of compartments $20a-c$, $21a-c$ and $2a-c$ enclosed along two sides thereof by side plate members 27, 28, along the two ends by end plate members 24, 25, and along the top and bottom by surfaces of channel members $26a-c$ and $23a-c$, respectively, it being understood that a bottom cover plate member and even a top cover plate member may be utilized, if desired. Channel members $33a-c$ and $26a-c$ are fabricated of a suitable material such as a metal or plastic which is nonreactive with the liquid laser media employed. The unenclosed (and adjacent) fourth sides of channel members $23a-c$, $26a-c$ are each slotted through in a "zig-zag" pattern which is defined as alternate slots being parallel and adjacent slots angularly disposed relative to each other to form equal angles of virtually any size therebetween. Side plate members 27, 28 and separator plate members 29 are fabricated of a material substantially totally transparent to the pumping radiation, such as a suitable glass, and which is also nonreactive with the laser liquids. End plate members 24, 25 are fabricated of a material substantially totally transparent to the coherent electromagnetic radiations (laser beams) transmitted through central compartments $21a-c$ in a single-pass laser amplifier embodiment of our invention, and one of such end plate members is coated to be substantially totally reflective at the coherent radiation wavelengths in a two-pass laser amplifier embodiment. As in the case of all the embodiments disclosed herein, our device may also be utilized as a liquid laser oscillator by selectively coating end plate members 24, 25 to be respectively totally reflective and partially transmissive at the generally three different coherent radiation emission wavelengths and thereby define the well-known Fabry-Perot optical resonant cavities for the three corresponding oscillators. Alternatively, the oscillator embodiment may be derived by positioning one or both of the Fabry-Perot cavity mirrors of each oscillator in spaced apart alignment with compartments $21a$, $21b$, $21c$ adjacent end plate member 24 and, or 25. Side plate members 27, 28, end plate members 24, 25 and separator plate members 29 are fastened to channel members $23a-c$ and $26a-c$ in any suitable manner to provide a substantially liquid-tight structure, a groove-gasket structure around the channel members being illustrated as one example for obtaining the liquid-tight condition in FIG. 1, the fastening means being a suitable adhesive or clamping means such as machine bolt and nuts (not shown).

Tubings $30a-c$ are connected to, or adjacent a first end of (inlet duct) compartments $20a-c$, respectively, and form the inlet means for the liquid laser media. Tubings $31a-c$ are connected to, or adjacent the opposite end of (outlet duct) compartments $22a-c$ and form the outlet means for such liquids. Alternatively, the liquids may enter the device through tubings $31a-c$ and exit through tubings $30a-c$, but the first approach is preferred as a technique for permitting escape from compartments $21a-c$ of any bubbles developed in the flowing liquids. The remote ends of tubings $30a-c$ and 31a–c are connected to suitable pump means (not shown) for circulating the liquid laser media from the structure through the tubings 31a–c and back into the structure through tubings 30a–c, suitable cooling means for the liquids also being incorporated, if desired, as required by the particular circumstances.

Each of compartments 21a–c contain an equal or unequal plurality of serially arranged refracting prisms which are substantially transparent to both the coherent electromagnetic radiations wavelengths and electromagnetic radiation of pumping wavelengths used for optically exciting the liquid laser media. Compartments 21a–c (and therefore the prisms therein) may be of equal size as required by the circumstances, the compartments adapted to be unequal in breadth although generally equal in length. The refracting prisms include two end prisms 32 and at least one intermediate prism 33 retained in spaced apart relationship therebetween by any convenient means to form a zig-zag pattern of spacings 36 between adjacent prisms in each of separate compartments 21a–c. Prisms 32 and 33 are each right angle prisms and are equally spaced in the illustrated embodiments although these are not limitations on our invention. The prisms may be truncated to eliminate possibility of spontaneous lasing along the liquid zig-zag pattern through reflections off the surface of channel members 23a–c and 26a–c. Thus, prisms having different angular dimensions may readily be utilized in compartments 21a–c conforming to such shape, and the spacing 36 between adjacent prisms in compartments 21a–c (as well as the transverse dimensions of the flow channels in compartments 20-a-c and 22a–c) may be unequal when desired for particular circumstances. This feature permits each zig-zag pattern to be optimized relatively independently of the other zig-zag patterns in the structure as may be required by the use of different liquid laser media. In the illustrated preferred embodiments, prisms 33 have isosceles triangular top and bottom faces, and end prisms 32 are each equivalent to half an intermediate prism 33 as if cut transversely through the center thereof. The included angle between the base and either side of the isosceles triangles formed by the top and bottom faces of the refracting prisms equals the slot angle. Obviously, end prisms 32 may have other configurations such as hexahedronal which is merely an extension of the illustrated pentahedron prism 32. The prisms are retained in a desired spaced apart relationship in each of compartments 21a–c in any convenient manner and exemplified by tabs 34 provided in the four corners of each spacing 36, the tabs being oriented in spacing 36 with their width dimension equal to the width of such spacing. These tabs may be formed as part of the bottom and top surfaces of channel members 26a–c and 23a–c, respectively, in the machining of such surfaces.

The zig-zag pattern slots 35 in the top and bottom sides of channel members 23a–c and 26a–c, respectively, are aligned with, and of width equal to, the zig-zag spacings 36 between adjacent prisms. Thus, flowing sheets 36a–c (depicted in FIG. 2) of generally three different liquid laser media are confined and thereby formed in the spacings 36 in compartments 21a–c, respectively, by flows of the liquid laser media entering through inlet tubings 30a–c into compartments 20a–c, flowing through such compartments' slots 35 into spacings 36 and exiting through compartments' 22a–c slots 35 into compartments 22a–c and tubings 31a–c. The same liquid media may, of course, be used in more than one compartment with different regions of the emission band being selected for laser action. The flowing sheets 36a–c of liquid laser media are therefore of the same dimensions and form as spacings 36 and in the same zig-zag orientations. These liquid laser media sheets are illustrated herein as being of planar form although it is to be understood that nonplanar sheets may also be formed, if desired, by utilizing refracting prisms having the desired nonplanar shape along the major surfaces thereof which interface the spacings 36. In most cases, however, the liquid sheets are thin in comparison to their length. It should be understood that there may be some applications wherein the sheets of liquid laser media need not be flowing, and thus our invention disclosed in the FIGS. 1–12 embodiments is not limited to sheets of liquid laser media which are continuously flowing during operation of the device.

Assuming the general case wherein a plurality (three in the particular illustrated case) of laser beams each with a planar wavefront are either to be generated in an oscillator embodiment of our invention, or three incident laser beams are to be amplified in an amplifier embodiment, the first major side surfaces 37 of the refracting prisms 32 and 33 which interface spacings 36 are planar. The second major side surfaces 38 of the prisms which are remote from spacings 36 and juxtaposed with side plate members 27, 28 are the means through which the flowing sheets of liquid lasers media are optically pumped (optically excited sufficiently to establish a population inversion in a particular excited energy state characteristic of each of the particular liquid laser media). The pumping means may comprise, as one example, one or more flash lamps 36 positioned adjacent one or both sides of our device along the second major side surfaces 38 of the prisms. Surfaces 38 of alternate prisms are coplanar. This particular arrangement provides for a multi-laser beam, face-pumped laser device with the pumping means positioned laterally with respect to the laser beam axes which parallel the longitudinal axis of our device, the laser beam axes being indicated in FIG. 1 by arrows 40a–c. The refracting prisms cause substantially uniform illumination, and thus uniform activation or excitation across the major surfaces of the sheets (defined by the length and breadth thereof) of active liquid laser media (i.e., across the laser apertures) by the refraction and reflection of the pumping radiation upon surfaces 38 from the prisms 32 and 33, and thereby substantially eliminate one cause of laser beam distortion. The liquid laser medium sheets 36b flowing through central compartment 21b are optically excited by the pumping radiation from the flash lamps positioned on both sides of our device which is refracted through the prisms 32 and 33 in adjacent compartments 21a and 21c and is not absorbed in outer liquid sheets 36a, b due to mutually nonoverlapping absorption bands of the laser liquids.

In a preferred embodiment of our invention, flash lamps 39 are parallel to both side surfaces of our device as shown in FIGS. 1–3. The flash lamps are supported on each side within a housing 41 attached to side plate members 27 and 28. The electrode ends of the flash lamps are connected to a suitable pulsed, high voltage d.c. power supply (not shown) by means of electrical conductors 42. The inner surface 43 of housing 41 is highly reflective to reflect the pumping radiation emitted by the flash lamps substantially uniformly over major surfaces 38 of prisms 32 and 33. The reflectors may also be fabricated of a material such as aluminum. If desired, suitable masks 44 may be fastened on the inner and, or outer surfaces of pumping radiation transparent side palte members 27, 28 and separator plate members 29 extending vertically (as depicted in FIG. 1) along the spacings 36 between adjacent prisms to prevent spontaneous lasing along the liquid zig-zag paths or to prevent side pumping of the liquid laser media sheets. The material comprising masks 44 may be a ground glass for providing a nonspecularly or diffusely reflecting surface to prevent the spontaneous lasing.

The active liquid laser media employed in our device may be any laser liquid including a number of classes or organic dyes which are generally physically colored powders dissolved in suitable solvents such as water, ethanol, methanol, dimethyl sulfoxide (DMSO), ethylene glycol or fluorocarbons as typical examples. The organic dyes generally have the characteristic of fluorescing when dissolved in the solvent. One specific example of a class of organic dyes which are used in our device is the xanthene class, and three examples of such dyes dissolved in a solvent such as ethanol or DMSO and their color fluorescence and emission wavelengths are as follows: Rhodamine 6G, orange, 5,950 angstrom (A); Rhodamine B, red, 6,200 A; sodium fluorescein, green, 5,450 A; another laser dye being 7 diethyl amino-4-methyl coumarin, blue, 4,600 A. DMSO is especially desirable as a solvent since it permits a close matching of the index of refraction of a liquid laser medium to that of the prisms which may be fabricated of fused quartz or glass and has other desirable thermal, mechanical and optical properties especially suitable for laser applications such as ( 1 ) good coolant properties, (2) high photostability whereby the coolant is not degraded by repetitively pulsed pumping flash lamps, (3) low absorption at many of the emission wavelengths of the liquid laser media whereby only a small amount of loss is introduced into the optical resonant cavity in an oscillator embodiment of our zig-zag laser or into the amplification path in an amplifier embodiment, (4) essentially transparent to pumping radiation in the range of 0.3 to 0.9 micron wavelengths. Another class of suitable laser liquids is a solution of neodymium ions in solvents which contain no low atomic weight constituents, such as selenium oxychloride. In the case wherein a desired three-color laser beam output is to be obtained, the laser liquids are chosen which have the desired emission band and have mutually nonoverlapping absorption bands. Thus, since the pumping radiation produced by conventional flash lamps usually includes a broad spectrum, more of it is utilized by employing the several laser liquids with mutually nonoverlapping absorpiton bands and our device is thus a more efficient source of laser beams having three (or more, or two) colors, i.e., visible or nonvisible wavelengths) than would be three separate lasers each individually pumped. The three output laser beams 40a-c are spatially separate (parallel and coplanar in the particular illustrated embodiment) and they can be readily combined into a colinear beam with the use of optical means such as suitable prisms, mirrors, gratings or beam splitters for example, FIG. 1 illustrating three juxtaposed mirrors 48 which are selectively transmissive to the appropriate laser beam(s) wavelengths and each oriented at the same 45° angle relative to the associated laser beam axis and equally spaced from end plate member 25 such that the three spatially separate laser beams are combined into a colinear beam.

In operation, flash lamps 39, which may be of the xenon arc type, produce pumping radiation which substantially uniformly illuminates major surfaces 38 of end prisms 32 and intermediate prisms 33. The flash lamps may be cooled in a conventional manner. When desired, a filtering jacket may be utilized around the flash lamps to filter out unwanted infrared or other pumping radiation wavelengths not effective in producing population inversions in the liquid laser media. The pumping radiation passes through the prism-liquid laser media interfaces and is substantially uniformly incident over the major surfaces of the liquid laser media sheets, any mismatch of the three different prism-liquid laser media refraction indices causing slight departures from the idealized and desired completely uniform pumping across the major surfaces of the liquid laser media and also causing reflection losses in the laser beams being transmitted through the device. However, the departure from the uniform pumping in the nonindexmatched case is generally only up to a maximum of approximately 5 percent and is therefore usually negligible and reflection losses are only in the order of 1 to 2 percent for the favored polarization of the laser beams. The reflection losses can be reduced by orienting the prisms-liquid laser media interfaces such that each of the three laser beams has an angle of incidence at such interface approximately equal to Brewster's angle which is generally close to 45°. Thus, it should be understood that maximum transmission of the laser beams through our zig-zag liquid laser device is obtained by refraction index matching of the liquid laser media and refracting prisms, although index mismatches can be tolerated by arranging the zig-zag geometry angle to achieve transmission through the index mismatched interfaces at Brewster's angle thereby taking advantage, in some cases which may prove desirable, of selected properties of the mismatched materials.

The use of pumping radiation-transparent side plate members 27 and 28 also has the effect of more uniformly illuminating the surfaces 38 of prisms 32 and 33 when they are thick due to the "light pipe" effect of such glass material between the surfaces 38 of the prisms and the pumping source. The transparent side plate members 27, 28 and intermediate plate members 29 make optical contact with surfaces 38 of the prisms or a thin layer of intermediate liquid and with total internal reflection at the sides of such light pipe, the pumping light incident upon the light pipe is refracted and reflected uniformly over prism surfaces 38. Transparent side plate members 27, 28 and intermediate plate members 29 preferably, but not necessarily, have substantially the same index of refraction as the refracting prisms 32, 33. The surfaces of the slotted sides of channel members 23a-c, 26a-c, which interface the refracting prisms 32, 33 are highly polished or suitably coated to provide a reflective surface to the pumping radiation and thereby increase the "light pipe" effect by reflecting any pumping radiation incident on such surfaces toward the liquid laser media sheets. Alternatively, the top and bottom surfaces of prisms 32, 33 may be reflection coated.

FIG. 3 illustrates an end view of another embodiment of our laterally face-pumped, multi-colored liquid laser device which employs an immersion technique for increasing the density of the pumping radiation flux upon the major surfaces of the liquid laser media sheets. The right angle subtending surface 50 of a right angle prism 51 having an index of refraction equal to or greater than the square root of two is oriented parallel to the device longitudinal axis and fastened to achieve a high degree of optical continuity with the right angle subtending surfaces 38 of the intermediate and end prisms 33 and 32. A plurality of flash lamps 39 in housing 41 having reflective inner surface 43 are arranged in banks approximately parallel to the right angle defining surfaces of the right angle prism 51 such that substantially all of the pumping radiation incident upon such right angle defining surfaces due to the optical and physical characteristics of the right angle prisms is refracted and totally reflected upon the right angle subtending surfaces 38 of prisms 32 and 33. This immersion technique increases the flux density of the pumping radiation by a factor of approximately the square root of two and concurrently uniformly illuminates the major surfaces of the liquid laser media sheets. The immersion technique may be employed on both sides of our structure as illustrated in FIG. 3, whereas in the case of the FIG. 4 embodiment herein to be described, may be employed only on one side. In all other details, the structure of FIG. 3 embodiment may be the same depicted in FIGS. 1 and 2.

The liquid laser media sheets may be optically excited from both sides as illustrated in FIGS. 1, 2, and 3 or merely from one side as shown in the sectional end view of FIG. 4, in the latter case the transparent side plate member 27 being coated with a mirror coating 49 substantially totally reflective to the pumping radiation. Alternatively, a mirror separate from member 27 may be utilized. Thus, the pumping radiation not absorbed upon the first pass through the liquid laser sheets is reflected back into the active liquid laser media by reflector 49 and it is evident that optical pumping from a single lateral position is also efficient.

FIG. 5 illustrates primarily the prism portion of our zig-zag liquid laser device utilizing a folded path technique for obtaining a more effective extraction of the stored energy in the liquid laser media. The remainder of the structure may be the same as in FIG. 1. Three right angle prisms 61a-c have their corresponding right angle subtending surfaces fastened to end plate member 25 and positioned to achieve a high degree of optical continuity with the total end surface of adjacent end prisms 32. At the opposite end of the laser device are positioned three right angle prisms 63a-c, smaller in size than prisms 61a-c and fastened to end plate member 24 in a manner to achieve a high degree of optical continuity with the lower half of the end surfaces of the other adjacent end prisms 32. The orientatin of the apices of prisms 63a-c are rotated 90° with respect to those of prism 61a-c.

Each of the three laser beams undergoes the same type of multipassage through the respective refracting prism compartment 21a-c and therefore only one of such beam paths will be described hereinafter. Laser beam 40c may enter the upper left quadrant of the end surface of end prism 32 through an input port (not shown), make four passages through the active liquid laser medium sheets within compartment 21c, and exit through the upper right quadrant of the end surface of the same end prism through an output port (not shown). As is evident from FIG. 5, laser beam 40c penetrates a different region (quadrant) of each liquid laser sheet in each passage through the prism assembly. The penetration of different regions allows an effective extraction of the stored energy in the active liquid laser media and by increasing the number of prisms adjacent one end prism 32, the number of reflective passages may also be increased with a concurrent increased amplification of the input laser beam as wil be described with reference to the FIG. 10 embodiment of our invention.

The embodiments of our face-punped liquid laser device described above and illustrated in FIGS. 1-5 each utilize pumping means positioned laterally with respect to the laser beam axes and pluralities of refracting prisms which refract and reflect the pumping radiation substantially uniformly across each thin liquid laser sheet (the laser apertures) due to the positioning of the liquid laser sheets in the zig-zag patterns. The positioning of the pumping means to the side allows a more compact, flexible arrangement, and, concurrently, eliminates the need for optical separators between the pumping radiation and laser beams. Another variation of our face-pumped multi-color liquid laser device is described hereinafter and illustrated in FIGS. 6-12 wherein wavefront distortion is minimized by the passage of a generally multi-color (colinear) laser beam through a plurality of superposed, elongated, rectangularly cross-sectioned flowing (or nonflowing) thin sheets of liquid laser media in an off-axial direction to effect multiple total internal reflections of the beam in its passage through the liquid laser media sheets. Since each ray of the coherent beam passes through substantially identical thermal environments during the transmission of the beam through the liquid laser sheets, the net distortion of the beam wavefront is substantially reduced. The emission wavelength characteristics of the colinear laser beam are determined by the particular liquid laser media being employed in our device, a relatively broad emission band corresponding to each specific liquid.

Figure 7:
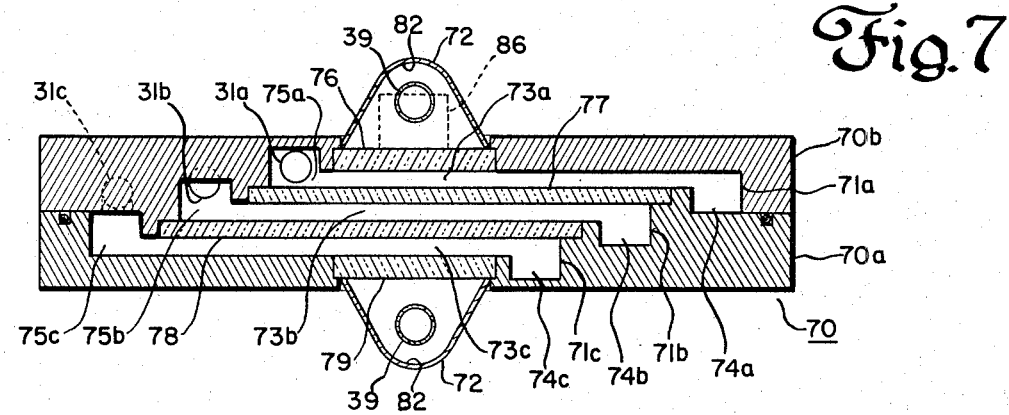
FIG. 7 is a longitudinal view, partly in section, taken through the center of the device of FIG. 6.
Figure 8:
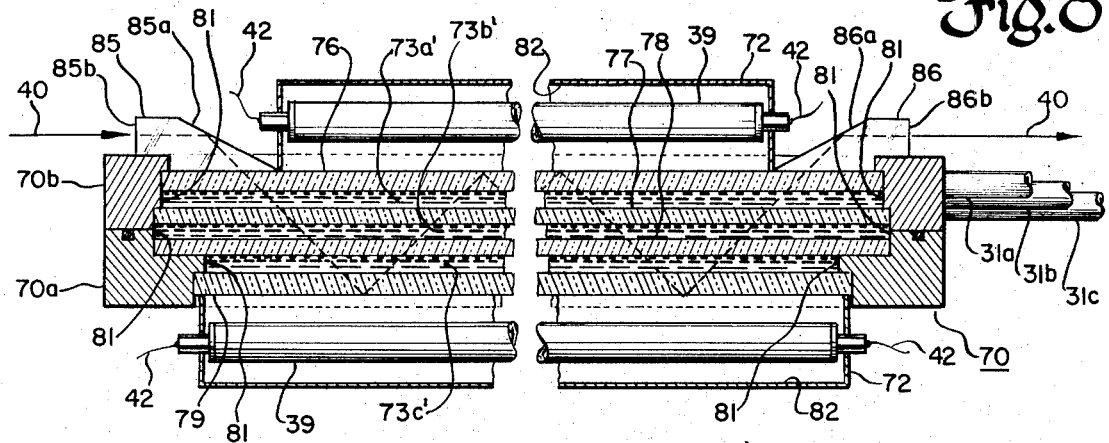
FIG. 8 is a transverse sectional view taken through the center of the device of FIG. 6.

Referring now to FIGS. 6, 7 and 8, there are shown an isometric view, longitudinal view partly in section, and transverse sectional view, respectively, of a first embodiment of our multi-color, face-pumped, multiple internal reflection, off-axial liquid laser device. The device includes a housing 70 having included therein a plurality (three in the particular illustrated embodiment) superposed liquid-tight chambers 71a-c in which three separate sheets of flowing liquid laser media are developed, and a single or two oppositely disposed chambers 72 for containing the pumping radiation flash lamps 39. Each of the liquid-tight chambers 71a-c comprises a central region for confining the flow of liquid laser medium (and thereby forming the liquid laser medium sheet) and two side ducts or channels with appropriate tubings for supplying the liquid laser medium to the central region and for exiting it therefrom. Thus, tubings 30a-c provide inlet means for introducing the flow of generally three different liquids to side ducts 74a-c, respectively interconnected with central regions 73a-c along first sides of the side ducts, and tubings 31a-c respectively provide the outlet means for exiting the flowing liquids from side ducts 75a-c interconnected with the central regions along second sides thereof, opposite to the first sides. For thermal reasons it may be desirable to reverse the flow direction of one or more of the liquids, relative to others. Also, it may be desirable to utilize alternate sheets of an optically inactive cooling fluid to remove heat from the glass separators 77, 78 and to minimize transverse temperature distribution along the flow direction. Tubings 30a-c and 31a-c are shown as being connected at opposite ends of ducts 74a-c and 75a-c, respectively, it being obvious that connections could be made at other regions of such ducts. Again, the pump means for circulating the liquids through the tubings in the device, and an external liquid cooling means which may be used, are not illustrated. Side ducts 74a-c, 75a-c may have any of a number of forms, the criteria being that substantially uniform supplies of liquids be provided to central regions 73a-c as the liquids pass through central regions 73a-c from ducts 74a-c to ducts 75a-c. In the illustrated embodiment, ducts 74a-c, 75a-c are rectangular cavities of equal (or they can be unequal, as required) size formed into base member 70a and upper member 70b of housing 70, the longitudinal axes of these cavities being parallel with the longitudinal axes of the central regions 73a-c.

Figure 11:
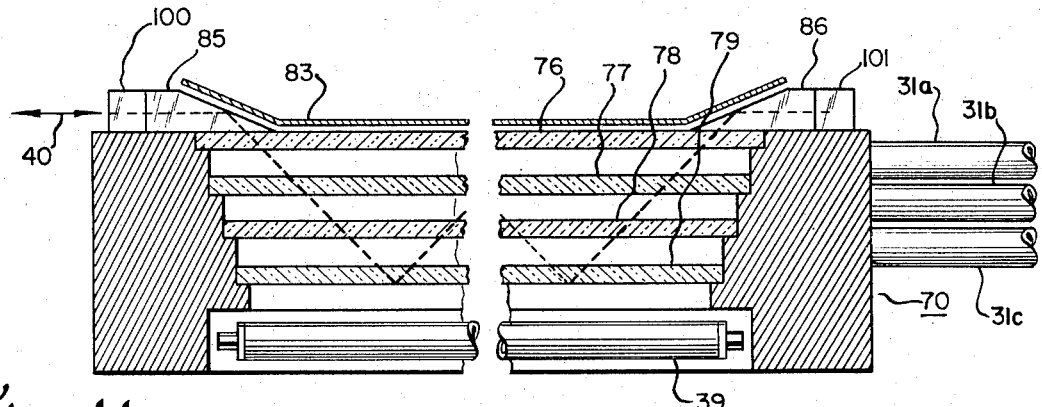
FIG. 11 is a longitudinal view, partly in section, taken through the center of the device shown only in part in FIG. 10.
Figure 12:
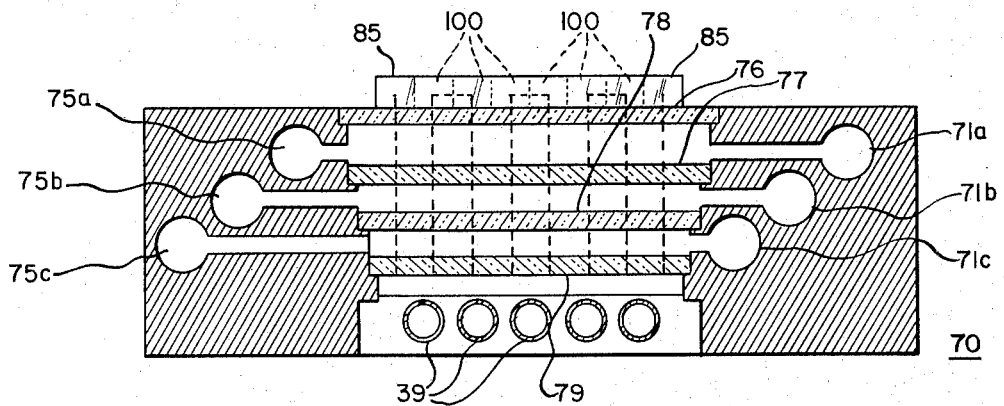
FIG. 12 is an end view in section of the device shown in FIG. 11.

Central sheet forming regions 73a-c are defined by parallel, planar top and bottom surfaces. Thus, central region 73a is defined by the bottom surface of top plate member 76 and the top surface of the first intermediate separator plate 77, central region 73b is defined by the bottom surface of member 77 and the top surface of second intermediate separator plate 78, and central region 73c is defined by the bottom surface of member 78 and the top surface of bottom plate member 79. Plate members 76, 77, 78 and 79 are each fabricated of a material such as glass substantially totally transparent to both the coherent and pumping electromagnetic radiation wavelengths, are of sufficient length and width to overlap those portions of central region 73a-c which are opposite pump lamp chambers 72, and are suitably attached in housing 70 to form a liquid-tight structure. Upper housing member 70b is fastened to base member 70a in any suitable manner and a groove-gasket structure provides a liquid-tight seal therebetween. Top plate member 76 separates the top optical pumping cavity 72 from the adjacent sheet forming central region 73a and bottom plate member 79 separates the opposite optical pumping cavity from the adjacent sheet forming central region 73c whereas the two intermediate plate members 77 and 78 each separate the two adjacent sheet forming regions 73a-b and 73 b-c, respectively. Obviously, any of the surfaces of base members 70a and upper member 70b of the housing and the transparent members 76–79 in contact with the liquid laser media, must be nonreactive therewith. The top surface of transparent plate 76 and the bottom surface of transparent plate 79 are polished to an optical flatness, e.g., flat to within one-eighth of the wavelength of the combined coherent radiation emitted by the liquid laser sheets to minimize losses and distortion during reflection of beam 40. The central regions 73a-c are enclosed along their longitudinal sides by interior end walls 81 of housing 70. An exemplified pumping means in the form of one or more parallel disposed flash lamps 39 are positioned in one or two chambers 72 positioned along opposite sides of the device adjacent the central regions 73a and 73c. To assure uniform pumping of both major surfaces of the liquid laser media sheets 73a-c as readily seen in FIGS. 7 and 8 (or only first major surfaces thereof as depicted in FIGS. 11 and 12), the radiation emitting portions of lamp(s) 39 are parallel with central regions 73a-c and extend substantially the entire length of sheets 73a'-c' of the liquid laser media. Reflective surfaces 82 on the walls of pumping cavities 72, or separate pumping radiation reflectors, maximize the intensity of pumping radiation penetrating the sheets of liquid laser media to produce the population inversions therein. Cavities 72 may also be of rectangular or other form and are juxtaposed in parallel relationship with top and bottom plate members 76 and 79.

The liquid laser media sheets may be of equal thickness or unequal, as required by the particular circumstances, this feature and the capability of providing unequal size ducts 74a-c, 75a-c again permitting relatively independent optimization of the separate sheets as may be required by the use of different liquid laser media. The effective width of each liquid laser media sheet is substantially equal to the width of the top and bottom plate members 76 and 79, respectively, wherein such plate members are the pumping radiation windows and such width dimension is obvious in FIG. 8.

A pair of glass prisms 85 and 86 are suitably mounted at opposite ends of the liquid laser media sheets 73a'-c' to direct the laser beam 40 upon optically plane surfaces at an angle of incidence to produce total internal reflection of the incident beam. The bases of prisms 85 and 86 may be fixedly secured to the top surface of transparent plate 76 by an optically contacting adhesive such as glycerine, the prisms being oriented in alignment at opposite ends of plate 76 and centrally thereof from the sides.

An incident laser beam 40 impinges upon outer end face 85b of prism 85 at an attitude normal relative to the plane of the face and is then reflected off angularly disposed face 85a into and through the sheets of liquid laser media at an angle of incidence producing a total internal reflection of the incident beam as illustrated in FIGS. 6 and 7. A typical angle of incidence is approximately 45°. The rays of the incident beam are thus reflected at a 45° angle off the optically plane bottom surface of glass plate 79 (i.e., a glass-air interface). Alternatively, prisms 85 and 86 may have sloped outer surfaces 85b, 86b and the laser beam is incident on such surface at Brewster's angle, thereby eliminating the reflection losses at said faces. Also, the multiple internal reflections may be from glass-water or other glass-chamber 71a-c, outer environment interfaces, the latter interfaces necessitating the refractive index of the chamber outer environment be less than that of the glass amd laser liquids. Also, the angle of incidence between the laser beam and laser liquid-glass interface may be made to be Brewster's angle for the case of a liquid with index significantly different from glass, thus minimizing losses for a polarized beam. The geometric area of the prism faces and the beams and the angle of indicence of the beam upon such interface assures the passage of the beam through substantially the entire volumes of the liquid laser sheets in a single pass down the sheets thereby maximizing laser device efficiency.

Prisms 85 and 86 thus provide the means for introducing a laser beam in an off-axial direction into the liquid laser sheets and for exiting the beam therefrom preferably aligned with its original axis (prior to its introduction into the device). As employed herein, off-axial direction signifies an angular, or nonparallel disposition of the laser beam relative to the parallel longitudinal axes of the liquid laser sheets such that the angle of incidence of the laser beam on the optically plane surfaces of glass plate members 76 and 79 produces multiple total internal reflections of the laser beam off the glass-air interfaces thereof during traverse of the laser beam between prisms 85 and 86.

Laser beam 40 traverses the length of the liquid laser sheet as seen in FIGS. 6 and 7 in oscillating fashion, being multiply reflected off the upper plate 76-air and lower plate 79-air interfaces before emerging from the outer end face 86b of prism 86 in amplified form. Because each ray of the coherent beam passes through identically diverse regions in the liquid laser media which are generally nonuniform in temperature, especially if a liquid nonflowing operating mode is employed, all rays lying within the plane of FIG. 7 pass through substantially identically mixed optical environments and the wavefront of the beam is affected uniformly thereby substantially eliminating thermal-optic distortion of the wavefront. That is, the net phase distortion of the beam wavefront upon traverse through the liquid laser sheets is substantially reduced relative to distortion produced within axially transmitted coherent beams of electromagnetic radiation in rod-like liquid lasers. This feature is especially important in high repetition rate operation of the laser device wherein the resulting thermal gradients across the thickness of the liquid laser media sheets (the laser device aperture in the rod-like laser) become significant.

The outer faces 85b and 86b of prisms 85 and 86, respectively, may be coated with the hereinabove-mentioned totally reflective and partially transmissive mirror coatings for converting the tricolor laser amplifier into a tricolor oscillator. Alternatively, a substantially totally reflective mirror 87 may be positioned adjacent the outer face 85b of prism 85 and a partially transmissive mirror 88 positioned adjacent the outer face 86b of prism 86, (see FIG. 6), mirrors 87 and 88 being aligned with the longitudinal axes of prisms 85 and 86 to convert the mirrorless single-pass laser amplifier to a laser oscillator. A single totally reflective mirror, or coating on only one prism 85 or 86 converts the single-pass amplifier to a double-pass amplifier.

A suitable optical means such as a dispersing prism 89 aligned with face 86b of prism 86, separates the three-color colinear laser beam 40 into its three color component beams 40a, 40b, and 40c when such three separate beams are desired. Suitable mirrors or prisms can also be utilized for orienting the three separate beams into parallel relationship, if desired.

Figure 9:
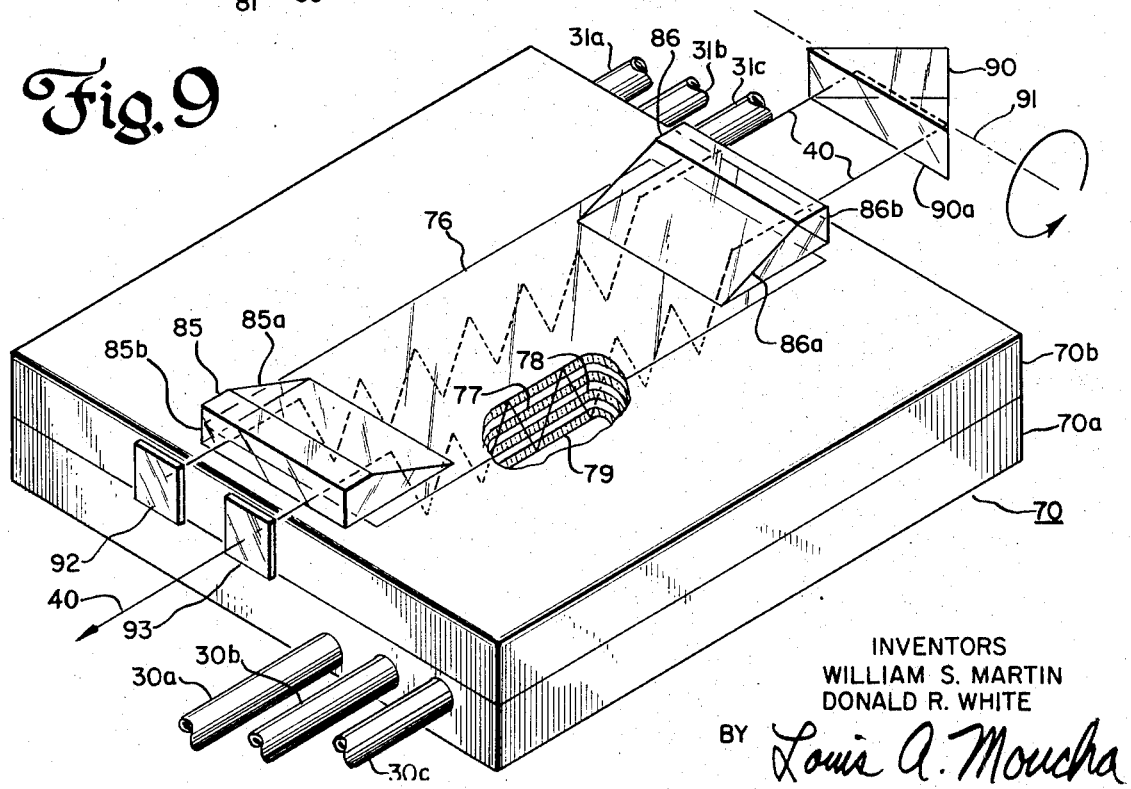
FIG. 9 is a partially broken away isometric view of a multiple internal reflection embodiment of our liquid laser device utilized with single laser beam path folding apparatus.

A further increase in the amplification of the off-axial liquid laser device is achieved by employing the device illustrated in FIG. 9 wherein the laser beam is folded back once through diverse portions of the sheets of flowing liquid laser media. The pumping radiation means is not illustrated for purposes of drawing simplification. Prism 86, like prism 85, functions to refract the coherent laser beam 40 from a plane parallel to the top surface of transparent plate 76 to a plane disposed at an angle in excess of the critical angle of incidence relative to the bottom surface of transparent plate 79. A reflector 90, such as a right angle prism is supported in alignment with prism 86 adjacent outer face 86b such that the right angle subtending major face 90a of prism 90 is parallel with face 86b (alternatively it may be at Brewster's angle to the incoming laser beam), and the prism 90 triangular faces are parallel with the laser beam.

Figure 10:
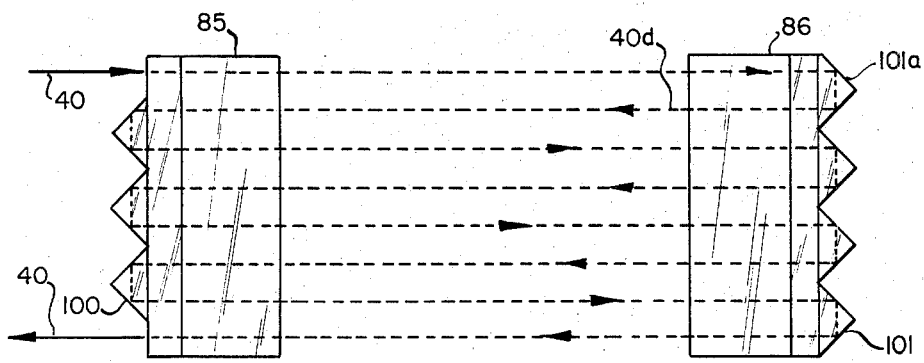
FIG. 10 is a top view of the prism and liquid laser media sheet portion of a multiple internal reflection embodiment of our liquid laser device utilizing multiple laser beam path folding.

The laser device of FIG. 9, as well as the other disclosed embodiments may be Q switched with devices such as a Pokel's Cell or may be operated in a Q-switch mode by rotating prism 90 about transverse axis 91 as indicated by the circular arrow to intermittently transfer the coherent electromagnetic radiation between prisms 86 and 90. Thus, in the stationary position of prism 90, or during rotation upon its orientation being the same as in the fixed position (i.e., face 90a being parallel with face 86b), the laser beam is reflected by prism 90 to longitudinally pass through the portion of the liquid laser media sheets untraversed by the laser beam approaching prism 90 and with the same multiple total internal reflections off the glass-air interfaces. FIG. 10 illustrates prism 90 in the particular orientation to obtain the hereinabove described reflection whereby the laser beam 40 traverses a return path through the liquid laser sheets. Juxtaposed, totally reflective and partially transmissive mirrors 92 and 93, respectively, function to reflectively transmit coherent electromagnetic radiation through the sheets of flowing liquid laser media to convert the device to a double-pass laser. Omission of mirrors 92, 93 converts the device into a double-pass liquid laser amplifier. Substituting of two lenses each substantially total transparent to the coherent radiation for mirrors 92, 93 may be made, if desired, and the two lenses then constitute the input and output ports. End prism 90 may obviously be integral with prism 86, and other forms of external prisms or mirrors and different shaped face 86b of prism 86 may also be utilized in the FIG. 9 embodiment to obtain the double-pass traverse of the laser beam through the liquid laser media sheets. The single-folded path (i.e., double pass) embodiment of our multiple internal reflection, face-pumped liquid laser obviously obtains a greater amplification of the laser beam as compared to a single-pass embodiment as illustrated in FIGS. 6–8.

A still further amplification of the laser beam is obtained in the multi-path embodiment of our off-axial, multiple internal reflection, face-pumped laser device illustrated in FIGS. 10–12 wherein the laser beam multiply traverses the flowing sheets of liquid laser media in an off-axial direction by means of a plurality of triangular reflector prisms 100 and 101 mounted along the outermost edges of refracting prisms 85 and 86. The beam of coherent electromagnetic radiation, identified by center ray 40, is admitted to the liquid laser media sheets by prism 85 at an angle to produce a plurality of total internal reflections of the beam between the two glass-air interfaces in an initial pass longitudinally through the liquid sheets through a fractional cross-section area thereof. At the end of the first pass, the coherent electromagnetic radiation beam is refracted by prism 86, and impinged upon reflective face 101a of triangular prism 101 to be returned along a path 40d abutting the originally traversed path. The beam then is reflected in an identical manner between the outer triangular prisms 100 and 101 to substantially completely fill the volume of the flowing sheets of liquid laser media, and exits the liquid laser media by prism 85 (or prism 86 if desired) at a region remote from the beam admission region. In the preferred arrangement, the laser beam 40 is narrow in width relative to the width of the liquid laser sheets, i.e., the beam width is sufficiently less than a liquid laser sheet width (breadth to permit employment of an essentially square beam traversing substantially the total liquid laser sheet volumes.

FIGS. 11 and 12 illustrate that only single-sided (bottom face) pumping may also be employed with off-axial device, and such single-sided pumping may be utilized also in the FIGS. 6–9 embodiments, if desired. In the case of single-sided pumping, the top surface of transparent top plate member 76 is coated to be substantially totally reflective to the pumping radiation wavelengths, or is provided with an external pumping radiation reflector 83 which may extend along a portion of the prism faces 85a, 86a, if desired. Obviously, the orientation of the single-sided pumping means and reflector 83 may both be reversed, if desired.

FIG. 12 illustrates that a plurality of flash lamps 39 may be employed instead of only one for each side being pumped, and obviously the other disclosed embodiments may also use a plurality of lamps, if desired.

The laser beam in the FIGS. 6–12 embodiments may be admitted and removed from the liquid laser media adjacent the same major surface thereof as illustrated, or, the admittance and removal paths may be on the two opposite major surfaces thereof (not shown). The beam path folding prisms of the FIG. 5 embodiment may also be used with our FIG. 6 embodiment, if desired, and, in like manner, the beam path folding prisms of the FIG. 10 embodiment may be used in FIG. 1. The immersion prism of FIG. 3 may also be utilized in the FIGS. 1–2, 4–12 embodiments, if desired, for increasing the density of the pumping radiation incident on the sheets of flowing liquid laser media.

It is to be noted that conventional rod-like liquid laser oscillators generally are characterized by reflective surfaces, such as mirrored end faces, disposed at a perpendicular attitude along the longitudinal axis of the liquid laser body while the reflective surfaces of the laser devices disclosed in the FIGS. 6–12 embodiments herein either are acutely disposed relative to the parallel longitudinal axes of the liquid laser sheets, or are situated perpendicular to the longitudinal axes at a location outside the longitudinal planes of the liquid laser sheets. Further, compared with the aperture size of the rod-like lasers (which have an aperture determined by the rod-shaped liquid cross section) the embodiments disclosed in FIGS. 1–12 can be large aperture devices (determined by the breadth dimension of the liquid sheets) with relatively small volumes of liquids being employed.

From the foregoing, it can be appreciated that the objectives set forth have been met and that our invention provides a liquid laser device wherein at least one major surface (face) of each of a plurality of flowing (or nonflowing) sheets of generally different active liquid laser media are optically pumped. The liquid laser device may be of a form utilizing only single sheets of the different liquids in which case a colinear multicolor laser beam longitudinally traverses the sheets of liquid laser media in an off-axial direction to effect multiple total internal reflections of the beam off the air-glass interfaces such that each ray of the beam traverses the same variety of optical environments with the liquid laser media sheets and thereby minimizes wavefront distortion of the beam. In the embodiment of our invention utilizing pluralities of sheets of the liquid laser media arranged in zig-zag patterns, spatially separate laser beams longitudinally traverse the zig-zag arrangements along the longitudinal axes of the zig-zag patterns. In the zig-zag embodiments, each ray of the laser beam also traverses the same variety of optical environments in each liquid sheet to thereby minimize laser beam distortion. The face-pumping feature of our invention appreciably improves the optical quality of the active laser liquids since the inversion and temperature distribution are essentially uniform across the aperture of the laser beam and the path length through the liquids is relatively short. Face-pumping allows an incrase in maximum achievable optical pumping density by using the immersion technique described herein. Finally, face-pumping geometry is particularly compatible with circulation of the active media, a necessary requirement for high repetition rate or CW excitation at high powers, since the liquid flows transverse to the laser beam.

A characteristic advantage of both the zig-zag and off-axial, multiple total internal reflection embodiment of our invention is that within broad limits the thicknesses of the laser liquid sheets may be optimized for fluid flow and low distortion considerations, and the active laser media concentrations may then be chosen for optimal absorption of the pump light in these thicknesses, all completely independent of the laser aperture. This decoupling of the variables provides a new degree of freedom (not present in rod-type liquid lasers) in the design of liquid lasers to meet requirements of specific applications. Also, the thin sheets of laser liquids permit the attainment of laser apertures much larger than in the rod-type liquid lasers (especially in the zig-zag embodiment) and with a smaller volume of the laser liquids being utilized.

While the invention has been set forth with respect to certain embodiments and specific examples thereof, many modifications and changes will readily occur to those skilled in the art. Although several specific laser liquids have been described hereinabove, it is to be understood that our invention is intended to include the use of any laser liquid as is also stated hereinabove.

The terms "active liquid laser media" and "laser liquids" are used synonymously herein, and are defined as any liquid(s) having the capability of being excited or optically pumped into one or more particular upper level or energy states characteristic of the particular liquid and achieving a sufficient populaton inversion in such state to cause a stimulated emission of coherent electromagnetic radiation therefrom again characteristic of the particular liquid.

The same liquids or different liquids having substantially the same absorption band may be used in any embodiment of our invention, by properly sizing the thicknesses of the liquid sheets whereby such liquids are approximately equally pumped. Finally, in the FIGS. 1–5 embodiments, an additional laser liquid sheet, oriented normal to the laser beam axis, may be utilized betwen each pair of zig-zag pattern sheets to provide additional active laser material in the optical paths of the laser beams and thereby provide additional energy storage and resultant increased laser beam amplification, at the expense of some pumping nonuniformity over the aperture.

It is, therefore, to be understood that changes may be made in the particular embodiments of our invention as described which are within the full intended scope of our invention as defined by the following claims.

What we claim as new and desire to secure by Letters Patent of the United States is:

1. A multi-color, face-pumped liquid laser device comprising
   means for containing a plurality of different active liquid laser media and for forming only one thin sheet of each of the liquid laser media wherein the liquid sheets are spaced from each other and each sheet has two opposing major surfaces defined by the length and breadth thereof,
   pumping radiation means positioned adjacent at least one of the major surfaces of one of said liquid laser medium sheets and in optical communication with the plurality of different liquid laser media sheets for optically pumping the liquid media through said at least one major surface and thereby exciting the active liquid laser media sufficiently to establish population inversions in the particular upper energy states characteristic of the laser liquids,
   means for stimulating the emission of at least one beam of coherent electromagnetic radiation from said active liquid laser media sheets through one of the major surfaces, said laser liquid containing and sheet forming means comprises:
   a liquid-tight chamber formed along two opposite outer sides thereof by two parallel oriented spaced apart elongated planar side members and at least one elongated planar intermediate member disposed intermediate and parallel to said planar side members and spaced therefrom, said planar side and intermediate members having planar major surfaces contigous with corresponding major surfaces of the single sheets of different liquid laser media formed therebetween, said sheets being of elongated form along the longitudinal axis of said laser device and being superposed and separated by said intermediate member, said planar side and intermediate members being substantially totally transparent to the pumping and coherent radiations,
   means for supplying the plurality of different laser liquids to the spacings between said planar side and intermediate members and for exciting them therefrom in a direction transverse to the elongated dimensions of said and intermediate members, the different liquid laser media being maintained separate from each other by said planar intermediate members,
   said pumping radiation means positioned along the outer planar major surface of at least one of said side members so that the pumping radiation is incident on one of the major'surfaces of at least one of the two outermost laser liquid sheets, and is thence transmittd through all of the sheets,
   first and second refracting prisms positioned at opposite ends of one of said planar side members and disposed in the optical path of the beam of coherent electromagnetic radiation for directing the beam of coherent radiation into and from the laser liquid sheets adjacent opposite ends thereof in an off-axial direction at an angle of incidence greater than the critical angle to produce multiple total internal reflections of the laser beam off the planar side member-chamber outer environment interfaces during traverse of the laser beam through the laser liquid sheets between the opposite ends thereof whereby each ray of the laser beam passes through substantially identical thermal environments to thereby substantially reduce distortion of the beam wavefront, the laser beam being a colinear beam having emission wavelength characteristics determined by the plurality of liquid laser media, said prisms being substantially totally transparent to the coherent radiation, and
   at least one triangular prism mounted along a portion of the outermost end surface of each of said first and second refracting prisms and disposed in the optical path of the colinear laser beam so that the colinear laser beam enters said laser device through a portion of a refracting prism outermost end surface along which the triangular prism is not mounted and undergoes a reflection off each of the triangular prisms to thereby multiply traverse the laser liqid sheets and more effectively extract the stored energies in the optically excited liquid laser media, the coliner laser beam exciting through another portion of a refracting prism outermost end surface along which a triangular prism is not mounted,
   the aperture of said laser device being determined by the breadth of sheets of liquid laser media so that a large aperture device may be obtained.

2. A multi-color, face pumped liquid laser device as in claim 1 wherein:
   said pumping radiation means is positioned along the outer planar major surface of only a first of said side members, and a second of said side members is provided with means for reflecting the pumping radiation back into the sheets of laser liquid to thereby obtain single sided pumping with a high degree of efficiency.

3. A multi-color, face pumped liquid laser device as in claim 1, wherein:
   said pumping radiation means is positioned along the outer planar major surface of both said side members to obtain a double-sided pumping.

4. The liquid laser device set forth in claim 1 wherein said first and second refracting prisms are mounted at opposite ends of a first of said planar side members.

5. The liquid laser device set forth in claim 1 wherein said first prism is mounted at a first end of a first of said planar side members, and
   said second prism is mounted at a second end of a second of said planar side members.

6. The liquid laser device set forth in claim 1 wherein the outer planar major surfaces of said planar side members having an optical flatness to within one-eighth of the wavelength of the coherent radiation emitted by the liquid laser media sheets to minimize losses and distortion of the colinear laser beam during reflection off the planar side member-chamber outer environment interfaces.

7. The liquid laser device set forth in claim 1 and further comprising
   optical means for dispersing the emitted colinear laser beam into a plurality of spatially separate beams of coherent radiation each characterized by a corresponding one of the plurality of liquid laser media.

* * * * *